(12) United States Patent
Moore et al.

(10) Patent No.: US 8,131,844 B2
(45) Date of Patent: Mar. 6, 2012

(54) CUSTOMER INTELLIGENCE IN A CLOUD OPERATING ENVIRONMENT

(75) Inventors: George Moore, Bellevue, WA (US);
Remy Pairault, Redmond, WA (US);
Federico Raggi, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 499 days.

(21) Appl. No.: 12/484,753

(22) Filed: Jun. 15, 2009

(65) Prior Publication Data

US 2010/0318649 A1    Dec. 16, 2010

(51) Int. Cl.
*G06F 15/173* (2006.01)
(52) U.S. Cl. ...................................................... 709/224
(58) Field of Classification Search .......... 709/200–227; 705/6, 1, 28, 26, 27, 56, 35, 37, 44, 10; 717/89–150
See application file for complete search history.

(56) References Cited

U.S. PATENT DOCUMENTS

| | | | |
|---|---|---|---|
| 2006/0184410 A1 | 8/2006 | Ramamurthy | |
| 2008/0189718 A1* | 8/2008 | Gulley et al. | 718/107 |
| 2008/0263436 A1 | 10/2008 | Ahrens | |
| 2008/0275844 A1 | 11/2008 | Buzsaki | |
| 2010/0088234 A1* | 4/2010 | Moore et al. | 705/52 |
| 2010/0185546 A1* | 7/2010 | Pollard | 705/80 |

FOREIGN PATENT DOCUMENTS

EP    1259084 A1    11/2002

OTHER PUBLICATIONS

Ori Amiga, "Live Framework and Mesh Services: Live Services for Developers," webcast presentation, link at Mixpo webpage dated Mar. 19, 2009, webpage address: http://videos.visitmix.com/MIX09/T05F (no date given).

Viktor Bogdanov, "Offshore Application Development Helps Customer Intelligence Provider Get State-of-the-Art Product," page from Articlebase Free Online Articles Director dated Apr. 1, 2009, 3 pp., webpage address: http://www.articlesbase.com/outsourcing-articles/offshore-application-development-helps-customer-intelligence-provider-get-stateoftheart-product-844949.html.

RSC—Regional Support Centre Eastern, "Business Intelligence Update," May 14, 2007, 4 pp., webpage address: http://info.rsc-eastern.ac.uk/files/news/4184_BusinessIntelligenceUpdate.pdf.

* cited by examiner

*Primary Examiner* — Joseph Avellino
*Assistant Examiner* — Mark O Afolabi
(74) *Attorney, Agent, or Firm* — Shook, Hardy & Bacon LLP

(57) ABSTRACT

Computer-readable media, computer systems, and computing devices for providing customer intelligence data to a developer of an application that runs on a cloud operating environment associated with an online services provider. The online services provider collects customer information about customers, each of whom is identified by a customer ID. A developer uploads an application, having a corresponding application ID, and manages the application using resources associated with the cloud operating environment. An analysis module creates a three-way mapping between the application ID, customer IDs corresponding to customers that use the application, and customer intelligence data associated with the customer IDs. Using this mapping, the system presents the developer with customer intelligence information based on the customer intelligence data.

20 Claims, 5 Drawing Sheets

CUSTOMER INTELLIGENCE IN A CLOUD OPERATING ENVIRONMENT

BACKGROUND

Developers write applications to make money. When those applications run, developers expect to understand their customers, either through direct market research or via instrumentation of their code to understand usage trends. This customer intelligence information can be invaluable to a developer in understanding how best to serve its customers, thereby maximizing its profits. Many developers seek to understand the higher-order "human level" information associated with their customers. This level of information would allow the developers to provide much more precise targeting ("narrowcasting") of their applications and services to make runtime decisions around providing a wholly unique and customized experience on a customer-by-customer basis. Examples of this "human level" information (referred to throughout as a component of "customer intelligence information") include: age, gender, home address, interests, commercial intent, and the like.

However, no matter how much instrumentation the developer places in the code, the developer will not know anything more about the customers than the customers themselves are willing to divulge. Many customers are unwilling to provide information due to privacy concerns, distrustfulness, or a simple lack of time. Thus, generally developers make do with the "physical level" information they can glean from the computing infrastructure. This includes metrics such as geographic location of the customer's IP address, browser language settings, timestamps, and the like.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention provide customer intelligence information to a developer or other user associated with a cloud services platform. According to embodiments, developers do not need to write additional code to enable the features described herein. By drawing upon the demographic and other rich customer intelligence that is often collected by service platform providers, the service providers can enhance the experience of developers who write and/or run applications on a cloud services platform.

Embodiments of the present invention provide a three-way mapping between the unique ID of the customer, the demographic and other "human level" customer intelligence data associated with that customer and the unique ID of the developer's application. Graphical representations of aggregations and other metrics associated with the data can be presented in a variety of forms. By enabling access to and creative delivery of this rich customer intelligence data, the developer can better make informed decisions about the features or direction of their applications and services. Moreover, the mapping allows for performing these analyses without compromising the privacy of individual customers since the service provider generally cannot uniquely identity a specific user without violating its own contractual and other legal obligations.

BRIEF DESCRIPTION OF THE DRAWINGS

Embodiments of the inventions are described in detail below with reference to the attached drawing figures, wherein.

DETAILED DESCRIPTION

Figure 1:
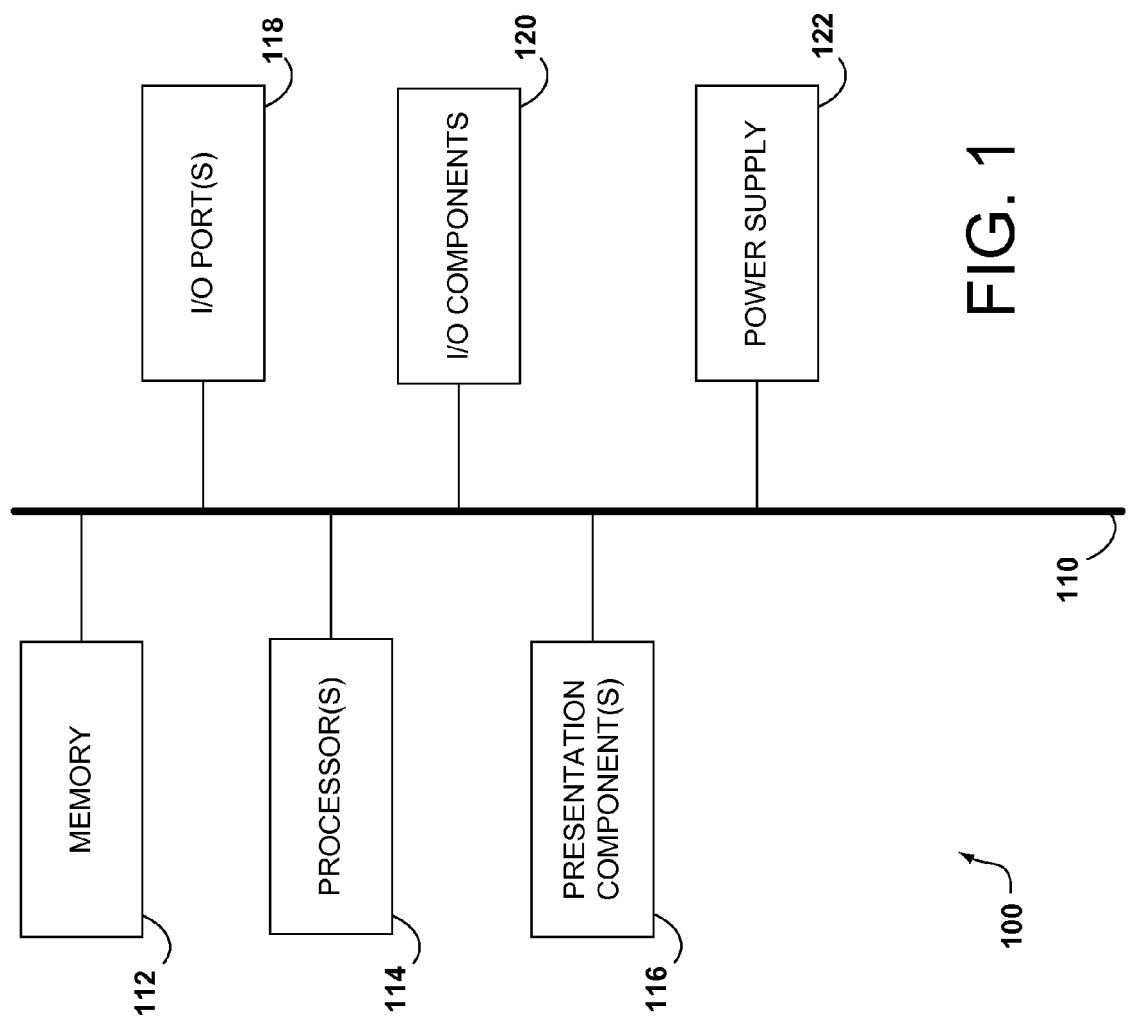
FIG. 1 is a block diagram of an exemplary computing device suitable for implementing embodiments of the invention.

The subject matter of embodiments of the invention disclosed herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the invention described herein include systems and methods for providing customer intelligence information to a developer of an application running on a cloud services platform. In a first illustrative embodiment, a set of computer-executable instructions provides an exemplary method of providing rich customer intelligence information associated with an application running in a cloud operating environment, the cloud operating environment being associated with a service platform comprising a plurality of resources. Embodiments of the method include presenting a developer with a user interface that includes selectable options for displaying customer intelligence information associated with the application. The developer can select options and specify or request an application identifier (ID) corresponding to the application. In embodiments of the invention, customer intelligence data corresponding to customers that use the application is retrieved and mapped to the application ID and correlated customer IDs. The data is analyzed according to the developer's requests and the results are presented on a display. In embodiments of the invention, the results can be displayed as text, tables, graphs, charts, and other graphics.

In a second illustrative embodiment, a set of computer-executable instructions provides an exemplary method of providing rich customer intelligence information associated with an application running in a cloud operating environment, the cloud operating environment being associated with a service platform comprising a plurality of resources. Customer intelligence data is collected and stored in a storage medium. An application ID is received from a developer, another user, an application, an application ID generator, or some other entity. Upon receiving a request for customer intelligence information associated with the application ID, program modules identify the customer IDs corresponding to customers that have utilized the application and map these customer IDs to the application ID. The customer IDs (at some point in time) are mapped to customer intelligence data. Aggregation parameters can be specified by a developer, and in return, the developer can be provided with a visual representation of customer intelligence information on a display.

In a third illustrative embodiment, a computing device is provided that facilitates providing customer intelligence information associated with an application running in a cloud operating environment. In embodiments, the computer system includes a storage medium having a number of program modules embodied thereon. When executed by a processor, the modules include a mapping module that communicates with a data store through a network. In embodiments, the mapping module receives an application identifier (ID), maps the application ID to one or more customer identifiers (IDs) corresponding to customers that have utilized the application, and maps each customer ID to customer intelligence data associated therewith. The modules also include an aggregation module that reads and aggregates customer intelligence data associated with the application ID and each customer ID to generate customer intelligence information and a presentation module that receives customer intelligence information from the aggregation module and causes customer intelligence information to be displayed on the display device.

Various aspects of embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including dedicated servers, general-purpose computers, laptops, more specialty computing devices, and the like. The invention may also be practiced in distributed computing environments where tasks are performed by remote-processing devices that are linked through a communications network.

Computer-readable media include both volatile and nonvolatile media, removable and nonremovable media, and contemplate media readable by a database, a processor, a router, and various other networked devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

An exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors 114 coupled with system bus 110 that read data from various entities such as memory 112 or I/O components 120. The one or more processors 114 execute computer-readable instructions to perform various tasks and methods defined by the computer-readable instructions. Presentation component(s) 116 are coupled to system bus 110 and present data indications to a user or other device. Exemplary presentation components 116 include a display device, speaker, printing component, etc.

I/O ports 118 allow computing device 100 to be logically coupled to other devices including I/O components 120, some of which may be built in. Illustrative components include a microphone, joystick, game pad, satellite dish, scanner, printer, wireless device, keyboard, pen, voice input device, touch input device, touch-screen device, interactive display device, or a mouse.

Figure 2:
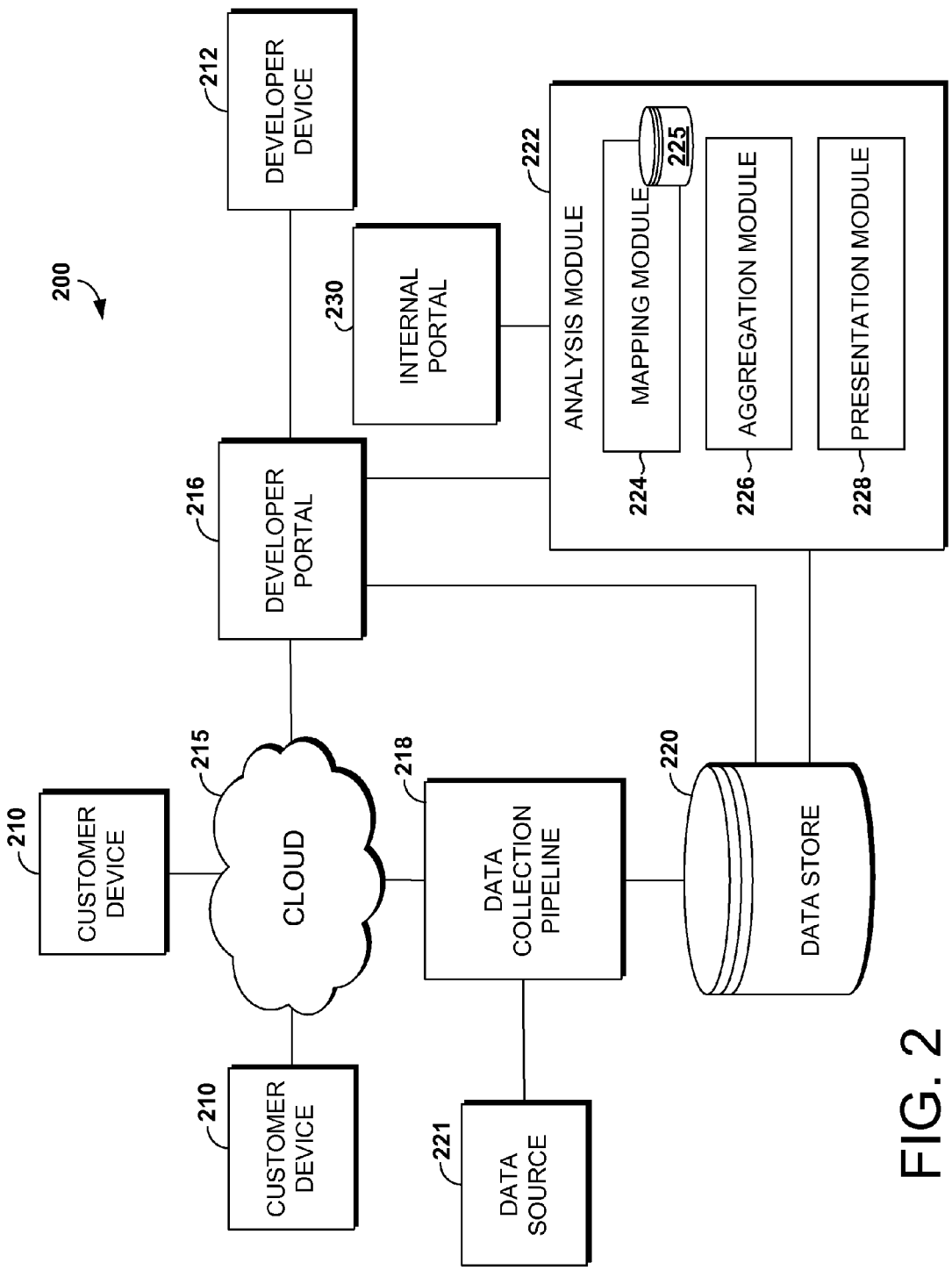
FIG. 2 is a block diagram of an exemplary networking environment suitable for use in implementing embodiments of the invention.

Turning now to FIG. 2, a block diagram of an exemplary network environment 200 suitable for use in implementing embodiments of the inventions is shown. Network environment 200 includes customer devices 210, a developer device 212, a cloud operating environment 215, a developer portal 216, a data collection pipeline 218, a data store 220, an analysis module 222, and an internal portal 230. Computing devices 210 communicate with cloud 215 through any number of networks (not illustrated), which can include any kind of suitable network such as, for example, a local area network (LAN), a wide area network (WAN), the Internet, a cellular network, a peer-to-peer (P2P) network, a mobile network, or a combination of networks. The exemplary network environment 200 shown in FIG. 2 is an example of one suitable network environment 200 and is not intended to suggest any limitation as to the scope of use or functionality of embodiments of the inventions disclosed throughout this document. Neither should the exemplary network environment 200 be interpreted as having any dependency or requirement related to any single component or combination of components illustrated therein.

Customer devices 210 can be any kind of computing devices capable of consuming applications and services hosted on cloud operating environment ("the cloud") 215. For example, in an embodiment, customer device 210 can be a computing device such as computing device 100, as described above with reference to FIG. 1. Developer device 212 also is a computing device such as, for example, computing device 100. Developer device 212 can be any type of computing device capable of interacting with developer portal 216 to present a graphical user interface (GUI) that a developer can use to configure and manage applications running on the cloud 215. For the purposes of the discussion herein, the term "application" refers to applications, application modules, services, service modules, APIs, function calls, program modules, scripts, and the like, which can be hosted by the cloud 215.

According to embodiments of the invention, the cloud 215 refers to a cloud services platform such as, for example, Windows Azure™ services. Cloud 215 can include a cloud services operating system and other operating systems and platforms such as, for example, Windows Live Services. In embodiments, cloud 215 can refer to additional service networks, communication networks, and the like. A cloud services operating system maintained by a service provider can include, for example, a development environment (e.g., for building applications); a service hosting environment, and a service management environment. Development environments can include, for example, integrated development environments (IDEs), software development kits (SDKs), libraries, code samples, and the like. In some embodiments, development environments supported by cloud 215 can support several programming languages.

In embodiments, service hosting and management environments can include, for example, modules and services can be included for managing user data, application resources, and the like. In an embodiment, cloud 215 provides access to a large array of servers in one or more data centers for processing logic associated with an application. In embodiment, cloud 215 includes storage devices and provides data storage services to users and applications, as well. In further embodiments, users consume application services via cloud 215 and user devices 210, while the service provider hosts the application. Developers and/or application managers can manage applications through developer portal 216.

Developer portal 216 can include a computing device or other network component that provides an interface through which developers can manage applications. In embodiments, developer portal 216 can include an interface, an application programming interface (API), a method, a function call, a hardware device, and/or any other type of conduit configured for allowing information to be provided to various components illustrated in FIG. 2. Developer portal 216 can facilitate presenting a number of user interfaces (UIs) that provide developers with an integrated application management experience. Such UIs can provide selectable options, information, displays of data, buttons, controls, and the like. By interacting with, receiving information through, and manipulating the UIs, developers can perform any number of tasks such as, for example, developing applications, testing applications, uploading applications, managing and updating applications, monitoring applications, evaluating customer reaction to applications, and the like.

As users consume application services via cloud 215, data associated with the users is saved in a data store 220. Data store receives information that is acquired through a data collection pipeline 218. Additionally, other data source such as data source 221 can provide data to data store 220. For example, in an embodiment, the components illustrated in FIG. 2 are part of a larger operating framework such as, for example, Windows Live Services. Customer intelligence information captured by various modules and entities throughout the larger framework can be referred to as data source 221 and can provide customer intelligence data to data store 220. In this manner, developers can access rich customer intelligence information that includes parameters beyond those concerning the developer's applications.

For example, customer intelligence data can include demographics such as age, gender, social-economic status, race, and the like. In embodiments, customer intelligence data can include geographical location, home address, and the like. In some embodiments, customers can provide data such as interests, hobbies, and the like. Other data such as inferred commercial intent, search histories, trends, and patterns, and the like can be collected and included in customer intelligence data.

Data collection pipeline 218 can include any number of devices, machines, and the like that include program modules, operating environments, executable code, and the like for acquiring data from the cloud 215 and storing the acquired data on computer-storage media associated with data store 220. In embodiments, data collection pipeline 218 can include various mechanisms, modules, filters, and the like that sort, filter, clean, and otherwise process the collected data according to various parameters established by network operators. According to one embodiment of the present invention, for example, customers' online viewing habits can be carefully observed and interpreted in data collection pipeline 218 to determine personal data (e.g., age, gender, interests, etc.) about them. Using this data, when customers do not provide personal data or provide false information, this data can be overridden and substituted with the determined personal data.

Data collected by and/or processed in data collection pipeline 218 is stored in data store 220. In an embodiment, data store 220 can include a database or other data storage module. In one embodiment, data store 220 can be associated with one or more components 216, 218, and 222 of exemplary network environment 200. Data store 220 can be maintained on a single device, or can be distributed across several devices such as, for instance, in an implementation in which data store 220 includes a database cluster. Data store 220 can be structured according to a variety of techniques and can be configured to be searchable. For example, in one embodiment, data store 220 includes a table. In another embodiment, data store 220 includes a relational database that includes customer intelligence information, data associated with applications, data associated with developers, and the like.

As is further illustrated in FIG. 2, exemplary network environment 200 includes an analysis module 222. Analysis module 222 includes mapping module 224, aggregation module 226, and presentation module 228. In embodiments, analysis module 224 can include any number of other modules and components, as well. According to an embodiment of the present invention, mapping module creates a three-way mapping between an application identifier (ID) corresponding to an application running on the cloud 215, a user ID associated with a user of the application, and customer intelligence data associated with the user. This three-way mapping allows for analysis module 222 to provide rich customer intelligence information to developers of applications. In embodiments, the three-way mapping can be stored in a storage module 225.

In an embodiment, storage module 225 is a database or other data storage module. Storage module 225 can be maintained on a single device, or can be distributed across several devices such as, for instance, in an implementation in which storage module 225 is a database cluster. Storage module 225 can be structured according to a variety of techniques and can be configured to be searchable. For example, in one embodiment, storage module 225 includes a table. In another embodiment, storage module 225 is a relational database.

In response to a request from a user such as an advertiser, network manager, or the like, aggregation module 226 can reference the data in storage module 225 to aggregate customer intelligence data associated with an application. In embodiments, developers or other users can supply aggregation module 226 with parameters defining the type of information requested. Aggregation module 226 can retrieve data from data store 220 based on the parameters supplied and the three-way mapping maintained in storage module 225. Aggregated data can be processed and analyzed to generate customer intelligence information. Customer intelligence information can include any type of information associated with the customer intelligence data. For instance, customer intelligence information can include customer intelligence data, frequency counts, averages, time-series representations, other statistical measures, and the like.

Presentation module 228 prepares the customer intelligence information for presentation to the developer or other user and causes customer intelligence information to be presented on a display device connected to, for example, a developer device 212 or other device that may connect through another interface such as internal portal 230. According to some embodiments, presentation module 228 provides the customer intelligence information to developer portal 216, which causes the information to be displayed. In embodiments, internal portal 230 allows service provider employees, network managers, technicians, and the like to access the information generated by analysis module 222. In further embodiments, presentation module 228 can provide the customer intelligence information to other network components, program modules, and the like. Customer intelligence information can be presented in any number of ways. In embodiments, customer intelligence information is presented as tables, charts, graphs, or other graphical representations.

Analysis module 222 allows the developer or other user to view rich customer intelligence information without violating the privacy of individual users. This allows the developer, for example, to make more informed decisions about the features or direction of their applications. The analysis module 222 can allow a developer to look at analytics for an individual application, or across a number of applications. In some embodiments, the features of the present invention are fully integrated with the rest of the user experience provided by developer portal 216 and seamlessly leverage the various elements of the developer portal such as, for example, application ID, representations of applications, navigation of information via the developer portal 216, and the like.

Figure 3:
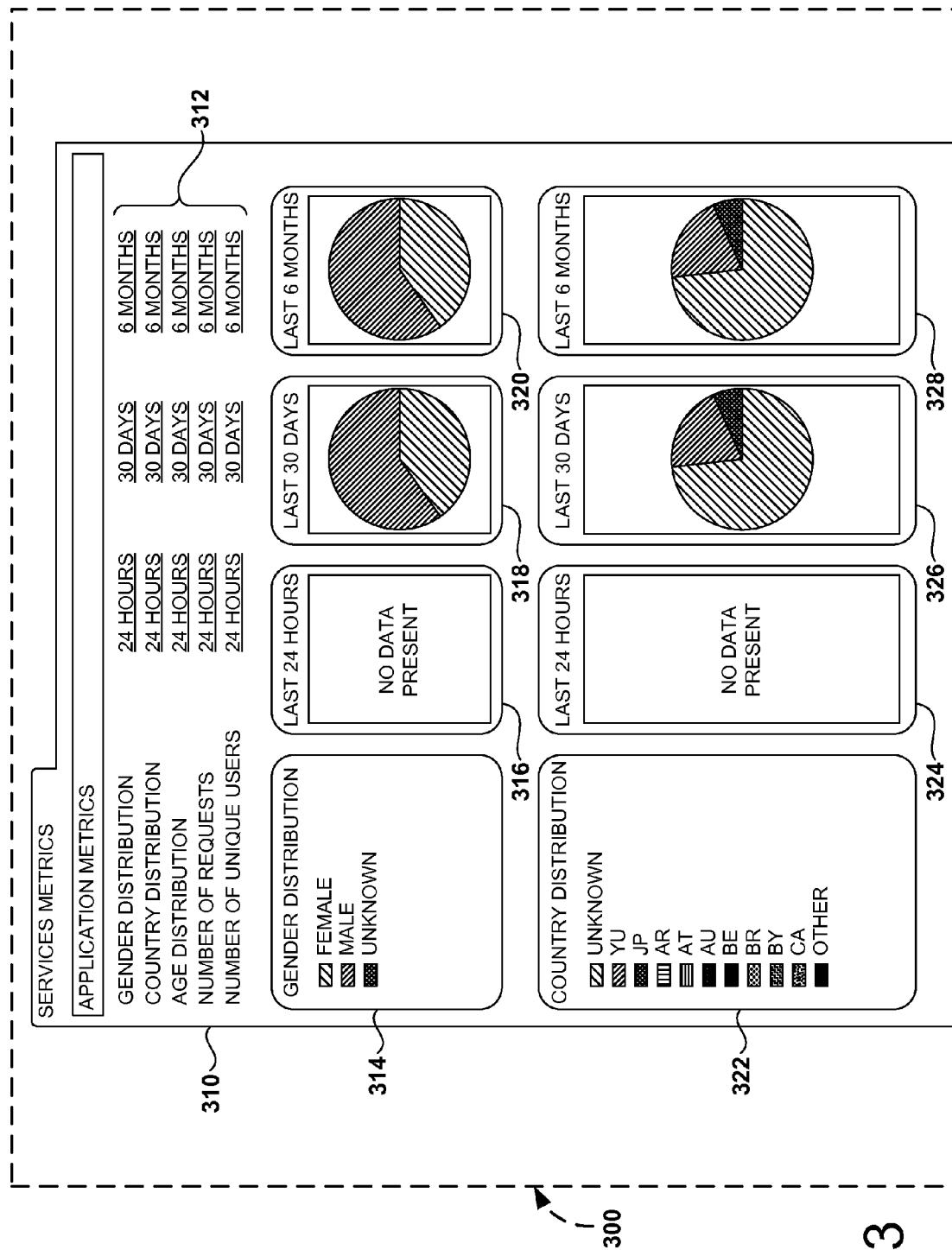
FIG. 3 depicts an illustrative display of a graphical user interface providing customer intelligence information in accordance with embodiments of the present invention.

Turning now to FIG. 3, there is illustrated an exemplary graphical user interface (GUI) generated by analysis module 222, illustrated in FIG. 2, and that may be presented on a developer's display device. This is only one example of many presentation forms and formats that can be used in embodiments of the present invention. The object of this discussion is to illustrate the developer experience according to embodiments of the present invention. As illustrated in FIG. 3, a GUI 310, is presented on a display device 300. According to embodiments of the invention, GUI 300 can be presented within many contexts, including, for example, within a cloud development environment, as discussed above with reference to FIG. 2. Aspects of the illustrative presentation on GUI 300 can be presented in response to a user input from a developer or other user such as by selecting an option on a screen, keying a command, and the like. In embodiments, aspects of GUI 300 can be presented automatically, in conjunction with additional graphics, text, etc., or in any other manner desired.

In the illustrative GUI 310 of FIG. 3, customer intelligence information is presented in the form of pie charts 318, 320, 326, and 328, with corresponding legends 314 and 322. In other embodiments, bar-graphs, histograms, scatter plots, line graphs, regression curves, ANOVA tables, contingency tables, and the like might be presentable. Any number of other formats might be used to present customer intelligence information. In still further embodiments, selectable options can be included on the GUI 300 that allow a developer or other user to select between different modes of displaying the customer intelligence information. In some embodiments, controls can be provided to the developer for manipulating various aspects of the presentation. In an embodiment, options can be provided for the developer to design the presentation format and layout prior to, during, or after the information is displayed. Other features such as selectable options 312 allowing a developer to select between various granularities of data aggregation, parameter types, and the like can be employed for a richer user experience.

Embodiments of the present invention can allow a developer to conveniently select between aggregation parameters, values, and the like so that different slices of customer intelligence information can be examined during a session. As discussed above with reference to FIG. 2, various metrics (analytics) can be generated and provided to the developer. For example, the GUI 300 illustrated in FIG. 3 includes selectable options 312 for a variety of metrics: gender distribution, country distribution, age distribution, number of requests, and number of unique users. Any number of other metrics can be generated and presented as well. In some embodiments, statistical analysis can be performed on the data, yielding presentable results in the form of tables, charts, graphs, etc.

Figure 4:
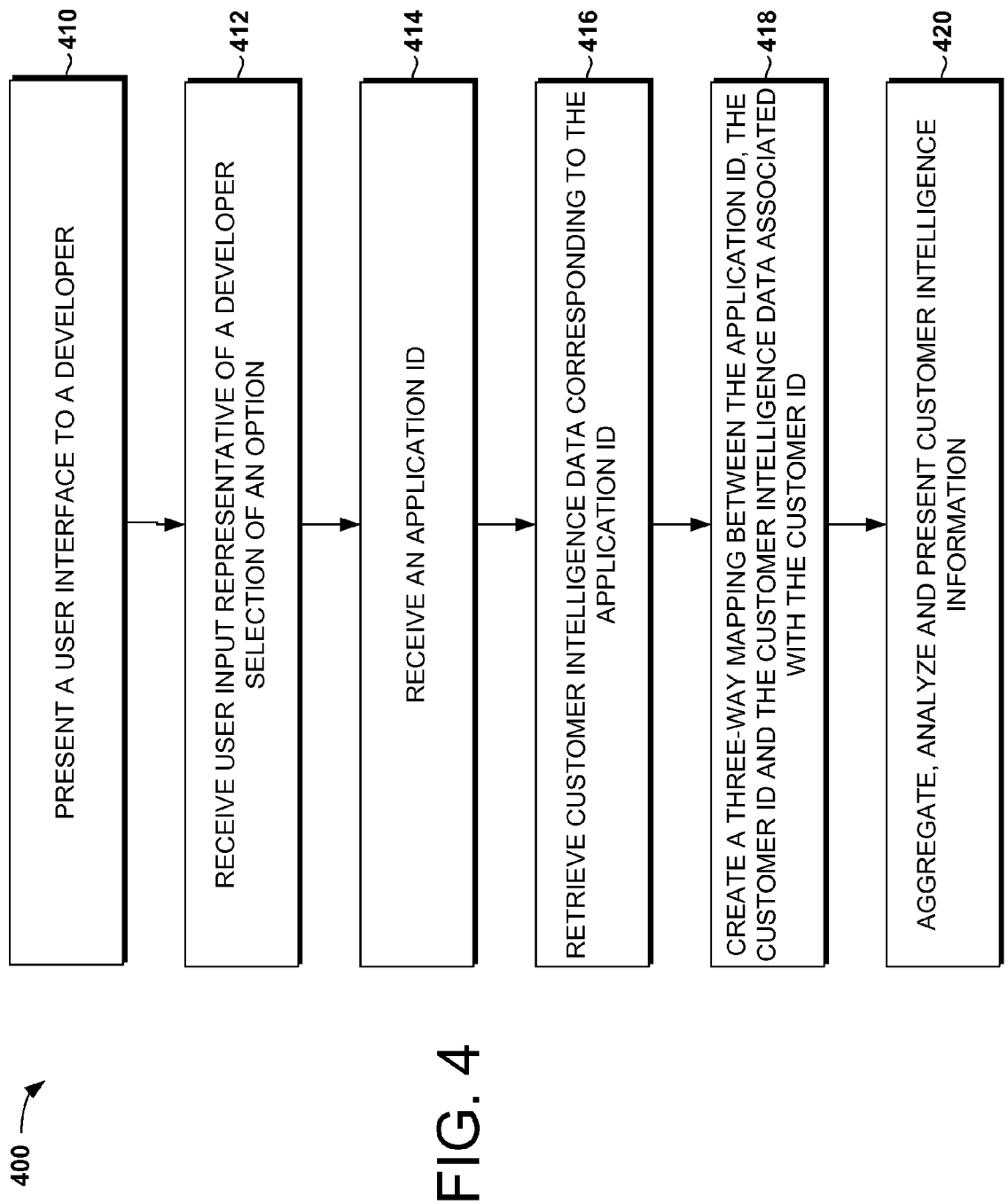
FIG. 4 is a flow diagram illustrating an exemplary method of providing customer intelligence information to a developer in accordance with embodiments of the invention.

To recapitulate, we have described systems, machines, media, methods, techniques, processes and options for providing rich customer intelligence information drawn from a customer base associated with a cloud service provider and associated with applications running in the cloud. Turning to FIG. 4, a flow diagram is illustrated that shows an exemplary method 400 for providing rich customer intelligence associated with an application running in a cloud operating environment according to embodiments of the present invention. In some embodiments, aspects of embodiments of the illustrative method 400 can be stored on computer-readable media as computer-executable instructions, which are executed by a processor in a computing device, thereby causing the computing device to implement aspects of the method 400. The same is, of course true, with the illustrative method depicted in FIG. 5, or any other embodiment of these methods. The computing device can be associated with the cloud operating environment and the cloud operating environment can be associated with a service platform. In embodiments, the service platform includes numerous resources and services.

In the illustrative method 400, at step 410, a user interface is presented on a developer's display device. The user interface includes selectable options for displaying analytic information associated with the applications running on the cloud. As discussed above with reference to FIG. 3, the selectable options can facilitate selecting between various metrics, parameters, values, display options, formats, and the like. The developer selects some option, and the system receives that user input, as shown at step 412. At step 414, the developer provides an application ID corresponding to an application. In embodiments, the developer may provide a number of application IDs, as well as other information associated with aggregation parameters. In some embodiments of the invention, application IDs, user IDs, and other credentials can be provided by developers or other users. In other embodiments, the service provider may generate these identifiers. Some embodiments may allow for a developer or service provider to optionally provide the IDs.

At step 416, customer intelligence data corresponding to the application ID is retrieved. In embodiments, the customer intelligence data includes information about a customer of the application, identified by a customer ID. An analysis module creates a three-way mapping between the application ID, the customer ID, and the customer intelligence data associated with the customer ID, as shown at step 418. The data is aggregated and analyzed, and the resulting customer intelligence information is presented on the display device, as indicated at step 420.

Figure 5:
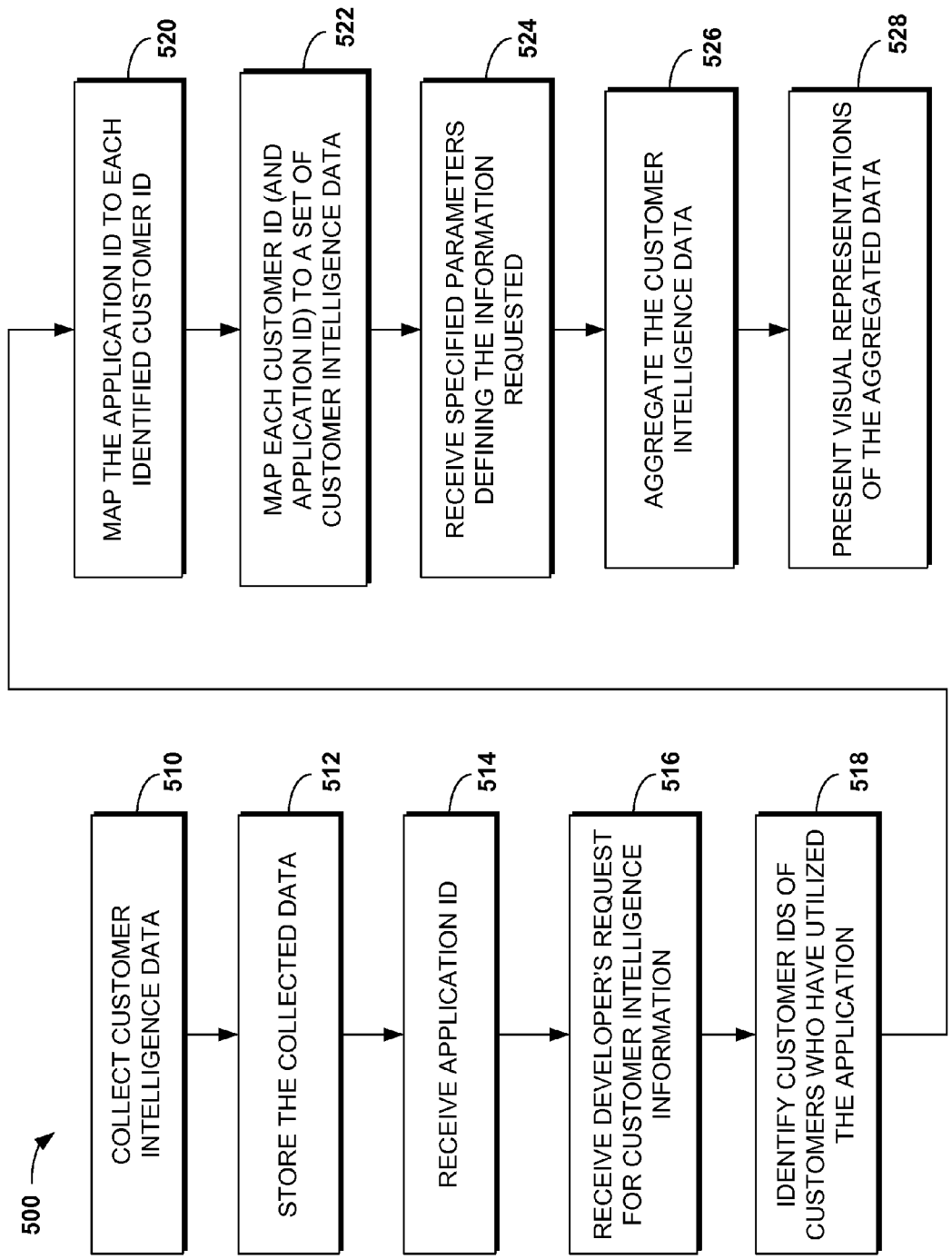
FIG. 5 is another flow diagram illustrating an exemplary method of providing customer intelligence information to a developer in accordance with embodiments of the invention.

Turning now to FIG. 5, another illustrative method 500 of providing rich customer intelligence associated with an application running in a cloud operating environment, where the cloud operating environment is associated with a service platform. Embodiments of that method include collecting customer intelligence data in a computing device, as illustrated at step 510. A communication component can be used to monitor, collect, and process any type of data desired. As shown at step 512, the method includes storing the collected customer intelligence data on computer-readable medium.

At step 514, either the developer, the application, the developer portal, or some other component, provides an application ID and at step 516, the developer requests customer intelligence information corresponding to the application (identified by the application ID provided in step 514). At step 518, an analysis component identifies a plurality of customer IDs corresponding to customers that have utilized the application. At step 520, the application ID is mapped to each customer ID identified and, at step 522, each customer ID (and thus, mapped application ID) is mapped to a set of customer intelligence data corresponding thereto.

A developer can, in embodiments, select between various options, parameters, and the like for designing the customer intelligence information request. As shown at step 524, the developer specifies parameters defining the information requested and at step 526, the analysis module aggregates customer intelligence data. At a final illustrative step, step 528, visual presentations of the aggregated data are displayed to the developer.

Various embodiments of the invention have been described to be illustrative rather than restrictive. Alternative embodiments will become apparent from time to time without departing from the scope of embodiments of the inventions. It will be understood that certain features and sub-combinations are of utility and may be employed without reference to other features and sub-combinations. This is contemplated by and is within the scope of the claims.

The invention claimed is:

1. One or more computer storage media having computer-executable instructions stored thereon, the instructions being executed by a processor in a computing device, thereby causing the computing device to perform a method of providing rich customer intelligence information associated with an application running in a cloud operating environment, the cloud operating environment being associated with a service platform comprising a plurality of resources, the method comprising:
    causing a user interface to be presented on a display device, the user interface comprising a selectable option for displaying customer intelligence information associated with the application;
    receiving a first user input via an input device, the first user input comprising a user selection of the selectable option;
    receiving an application identifier (ID) corresponding to the application;
    mapping the application ID to one or more customer IDs corresponding to customers that have utilized the application;
    mapping each customer ID to customer intelligence data associated therewith, wherein the customer intelligence data associated with each customer ID comprises information about a customer of the application;
    creating at least one three-way mapping among the application ID, the one or more customer IDs, and the customer intelligence data associated with the one or more customer IDs;
    aggregating customer intelligence data associated with the application ID and each customer ID to generate customer intelligence information; and
    causing the customer intelligence information corresponding to the application ID and the one or more customer IDs to be presented on the display device, wherein the customer intelligence information is based on the customer intelligence data.

2. The one or more computer storage media of claim 1, wherein the application comprises a communications service provided through the cloud operating environment.

3. The one or more computer storage media of claim 1, wherein customer intelligence data comprises demographic data associated with a customer.

4. The one or more computer storage media of claim 1, wherein customer intelligence data comprises behavioral data inferred from online activities corresponding to a customer.

5. The one or more computer storage media of claim 1, wherein creating the at least one three-way mapping comprises first obtaining express consent from each customer corresponding to each customer ID.

6. The one or more computer storage media of claim 1, wherein the application ID is received from the application.

7. The one or more computer storage media of claim 1, wherein receiving the application ID comprises receiving a second user input via an input device.

8. The one or more computer storage media of claim 1, wherein the customer intelligence information comprises one or more of a chart, a graph, and a table.

9. The one or more computer storage media of claim 8, further comprising providing selectable options on a user interface that allow a developer to modify the presentation of the customer intelligence information.

10. One or more computer storage media having computer-executable instructions stored thereon, the instructions being executed by a processor in a computing device, thereby causing the computing device to perform a method of providing rich customer intelligence information associated with an application running in a cloud operating environment, the cloud operating environment being associated with a service platform comprising a plurality of resources, and the computing device having a system bus that couples the processor to other components, the method comprising:

collecting customer intelligence data using a communication component coupled to the system bus;

storing the collected customer intelligence data on a computer-readable storage medium;

receiving a first user input via an input device that is coupled to the system bus through an I/O interface, the first user input comprising an application identifier (ID);

receiving a second user input via an input device that is coupled to the system bus through an I/O interface, the second user input comprising a user request for customer intelligence information corresponding to the application, wherein the application is identified by an application identifier (ID);

identifying a plurality of customer identifiers (IDs) corresponding to customers that have utilized the application, wherein said identifying comprises reading customer intelligence data from the computer-storage medium using the processor;

mapping the application ID to each of the plurality of customer IDs;

mapping each of the plurality of customer IDs to a set of customer intelligence data;

receiving a third user input via an input device that is coupled to the system bus through an I/O interface, the third user input comprising a specification of one or more parameters defining the information requested;

aggregating customer intelligence data associated with the application ID and each customer ID to generate aggregated customer intelligence information by using the processor to act upon customer intelligence data in the storage media; and causing a visual representation of the aggregated customer intelligence information to be presented on the display device.

11. The one or more computer storage media of claim 10, wherein the third user input further comprises a specification of an aggregation parameter.

12. The one or more computer storage media of claim 11, wherein the aggregation parameter comprises a value corresponding to the level of granularity of data requested.

13. The one or more computer storage media of claim 10, wherein the visual representation of the aggregated data is displayed as a component of a user interface.

14. The one or more computer storage media of claim 13, wherein the user interface comprises a plurality of selectable options that allow a user to modify the visual representation.

15. The one or more computer storage media of claim 14, wherein one or more of the plurality of selectable options comprises an option to change the granularity of aggregation of the data.

16. A computing device that facilitates providing customer intelligence information associated with an application running in a cloud operating environment, the computing device comprising:

a system bus that couples a plurality of system components, the plurality of system components comprising:

a display device connected to the system bus through a video interface;

a first input port that facilitates receiving customer intelligence information from a data store, wherein the data store communicates with the computing device over a network via the input port;

a second input port that facilitates receiving user input from an input device connected to the second input port, wherein the user input comprises a request for customer intelligence information, the request specifying one or more parameters;

a mass storage device that reads from and writes to nonremovable computer-storage media, the mass storage device being connected to the system bus through a memory interface, wherein the computer-storage media stores computer-readable instructions, the computer-readable instructions defining one or more methods for providing customer intelligence information to users;

a processing unit that executes the computer-readable instructions to provide a plurality of program modules that facilitate providing customer intelligence information associated with an application to a user, the application running in a cloud operating environment, the plurality of program modules comprising:

a mapping module that communicates with a data store through a network, wherein the mapping module receives an application identifier (ID), maps the application ID to one or more customer identifiers (IDs) corresponding to customers that have utilized the application, and maps each customer ID to customer intelligence data associated therewith, wherein said mapping comprises reading data from a computer-storage medium;

an aggregation module that reads customer intelligence data from a computer-storage medium and aggregates customer intelligence data associated with the application ID and each customer ID to generate customer intelligence information; and a presentation module that receives customer intelligence information from the aggregation module by communicating with the aggregation module through the system bus, wherein the presentation module causes customer intelligence information to be displayed on the display device.

17. The computing device of claim 16, wherein the cloud operating environment comprises an integrated development environment (IDE).

18. The computing device of claim 17, wherein the IDE comprises an associated software development kit (SDK).

19. The computing device of claim 16, wherein customer intelligence information comprises results of statistical analysis performed on the customer intelligence data.

20. The computing device of claim 16, wherein the presentation module causes the display of one or more of a chart, a graph, and a table.

* * * * *